Patented June 16, 1925.

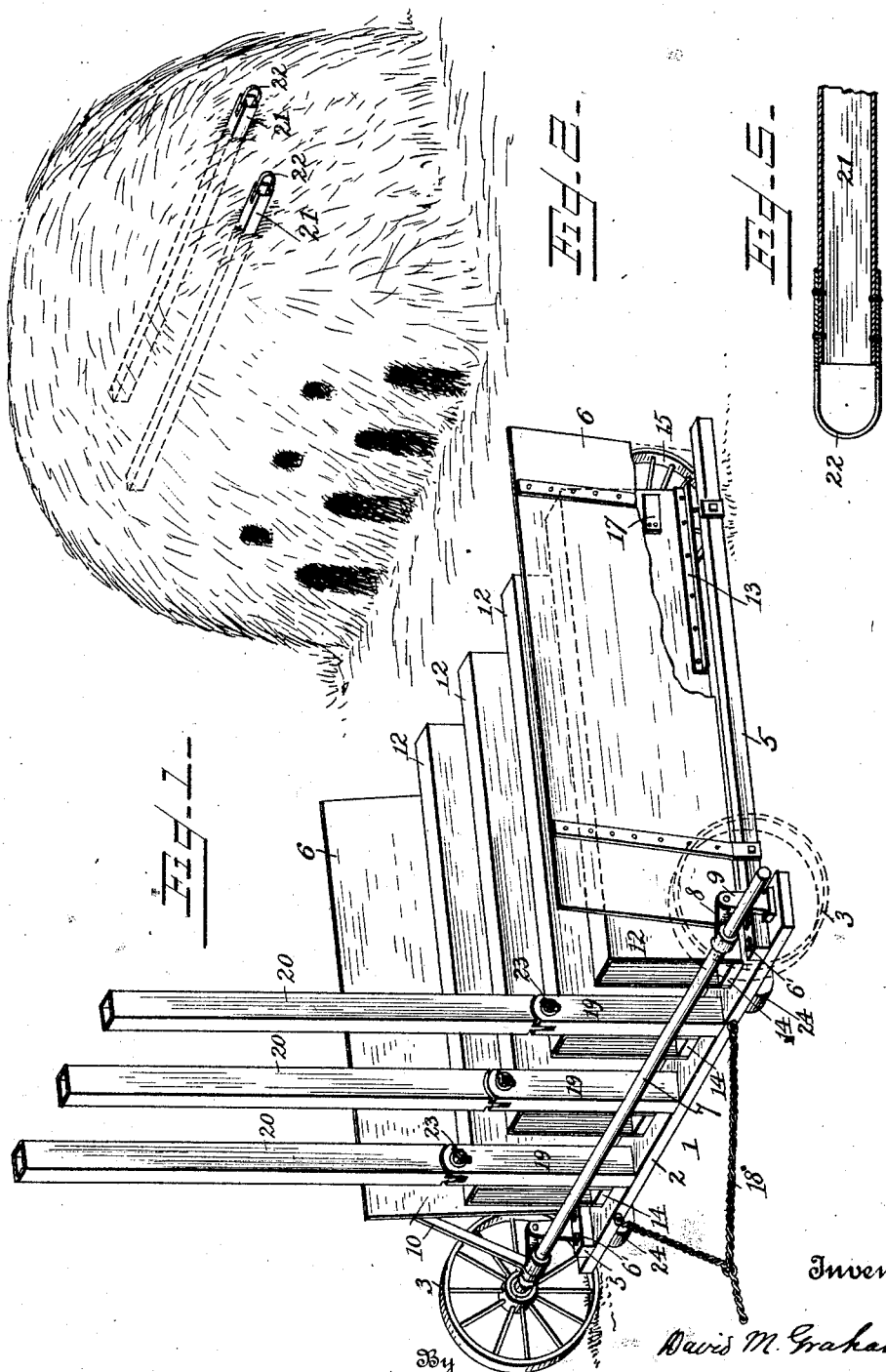

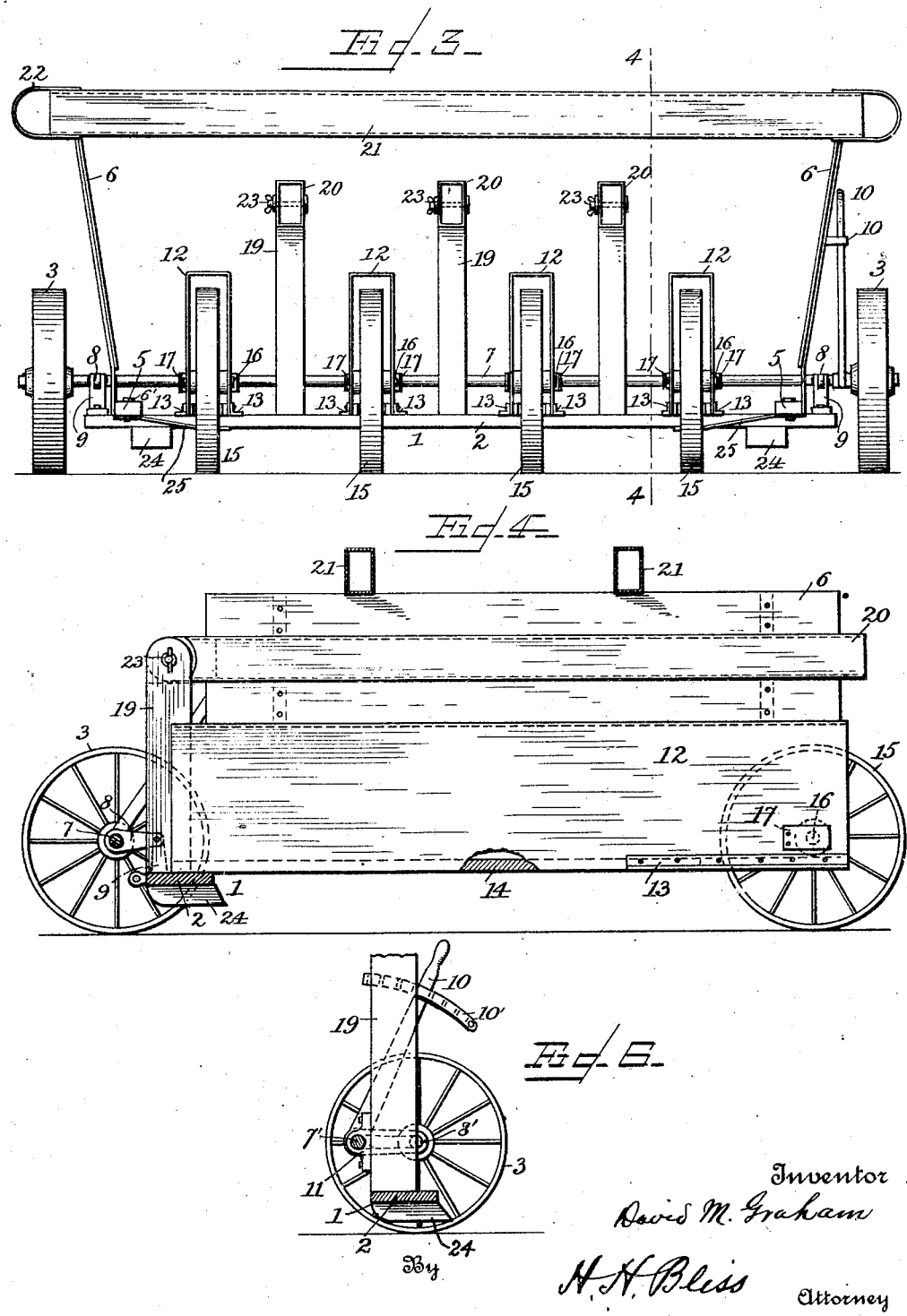

1,542,235

UNITED STATES PATENT OFFICE.

DAVID M. GRAHAM, OF BORDULAC, NORTH DAKOTA, ASSIGNOR TO GRAHAM-ROACH HARVESTER & STACKER COMPANY OF NORTH DAKOTA.

PROCESS OF STACKING AND CURING GRAIN.

Application filed April 3, 1918. Serial No. 226,423.

*To all whom it may concern:*

Be it known that I, DAVID M. GRAHAM, citizen of the United States, residing at Bordulac, in the county of Foster and State of North Dakota, have invented certain new and useful Improvements in Processes of Stacking and Curing Grain, of which the following is a specification, reference being had therein to the accompanying drawing.

The invention relates to the stacking and curing of grain or the like on the straw, having in view the perfecting of the process for the more advantageous treatment of the grain and for the treatment of grain which has been cut, either by necessity or by design, when it is in a relatively green condition and contains more than the usual amount of sap and moisture, and having in view also the shortening of the period of time required for the complete curing of the grain under such conditions. A further object of the invention is to enable the size of the stacks of grain to be materially increased without thereby causing a deterioration or spoiling of the grain in the interior of such large stacks by heating or molding from excessive moisture; such increase in the size of the stacks being a great economy of time and labor and teams required when the grain is to be conveyed to the thresher after the period of curing has elapsed. The invention may be considered as an improvement in and extension of the process fully set forth in my Patent No. 1,332,495 of Mar. 2, 1920.

The present improvements principally relate to such ventilation of the interior of the stack as is necessary for the proper curing of grain in large stacks or for the hastening of the period of curing when the grain is in smaller stacks, and it also relates to the restacking of smaller stacks of grain when it is desired, shortly after cutting or after a relatively short period of curing, and the combining of several of such small stacks into one much larger stack for a further period of curing which larger stack can be handled as a unit at the time of threshing for the conveyance of the same to the threshing machine.

With such objects in view, as well as other advantages which may be incident to the use of the improvements, the invention consists in the procedure hereinafter set forth and claimed, with the understanding that the several necessary elements constituting the same may be varied in proportions and arrangement without departing from the nature and scope of the invention.

In order to make the invention more clearly understood there are shown in the accompanying drawing means for carrying the same into practical effect, without limiting the improvements, in their useful applications, to the particular constructions which, for the purpose of explanation, have been made the subject of illustration. In the said drawings:—

Fig. 1 is a perspective view of a space forming device embodying the invention and adapted for use in carrying out the said process.

Fig. 2 is a perspective view of a formed stack of grain or the like.

Fig. 3 is a rear view of the space forming device.

Fig. 4 is a vertical section of the same on line 4—4 of Fig. 3.

Fig. 5 is a longitudinal sectional view of an end portion of one of the uppermost air space formers.

Fig. 6 is a view of another construction adapted for lowering and raising the front wheels of the forming device.

In carrying out the invention the grain is first cut and deposited on the ground, preferably in the form of a ventilated stack having a suitable air space or spaces therein, as set forth in my said patent. I may however form the grain into a solid stack without a special air space, the ventilated formation being made when two or more of such stacks are restacked on my ventilating air space former hereinafter described. The original or smaller stacks will be of such size as can conveniently be transported by or in connection with the grain cutting machine, and the larger stack ultimately formed will be of such larger size as can be transported as a unit to the threshing machine.

Referring to the drawing, 1 indicates a frame which is mounted close to the ground, on runners or on wheels, the latter construction being illustrated. In this construction the frame comprises a front cross bar 2 supported by wheels 3 and having at each side rearwardly extending side members 5 to which latter are attached upwardly and outwardly extending side boards 6 for containing the ends of the stacks up to a certain height and giving them an overhanging formation, so that the upper part of the stack may be made of greater horizontal area than the base. The side bars 5 are securely fastened to the front bar by bolts 6.

I have provided for raising and lowering the front wheels 3 for the purpose of dropping the front part of said frame slightly for the easier disengagement of the space forming device from the stack after the latter has been completed. In Figs. 1 to 3 the construction for this purpose comprises a front shaft 7 on which the wheels 3 are axially mounted, arms 8 extending rearwardly from said shaft, and brackets 9 fixed on the front bar 2 and serving as pivotal supports for the arms 8. 10 is a hand lever fixed on the shaft 7 and adapted to be held in adjusted position by a rack 10' attached to one of the side boards 6 (Fig. 3). In Fig. 6 the construction is slightly different and comprises an axle 7' which is mounted to rotate in bearings 11 fixed on posts extending upward from the bar 2, said shaft having cranked ends 8' serving as journals for the wheels 3. This latter mechanism is better adapted to hold the wheels accurately in line with one another.

Attached to and extending rearwardly from the front bar 2 are space formers 12, which may conveniently be of strong sheet metal. Preferably the lower edges of said formers are reinforced by metal strips or angle irons 13, and are attached to wooden bottom pieces 14 the front ends of which are attached to the bar 2. Each of the formers 12 is supported at its rear end by a wheel 15, and these wheels are preferably enclosed partly within the space formers and are mounted on short axles 16 which have bearings in the side walls of the space formers. 17 indicates rearwardly inclined guards which retain and cover the ends of the axles so that they will not catch on the grain when the device is withdrawn from the stack. 18 is a chain or other draft attachment by which the device may be moved about the harvest field from place to place as may be required, and by which it may be withdrawn from the stack after the formation of the latter. Attached to the front bar 2 are posts 19 which extend upward to points preferably about eight or ten inches above the top of the formers 12, and to the tops of said posts are pivotally attached space formers 20 which may be turned into vertical position (Fig. 1) while the lower part of the stack is being built over the formers 12, and which then may be turned down into horizontal position (Figs. 3 and 4) for the building up of the higher parts of the stack. It will be understood that the formers 20 are parallel with the formers 12 when the stack is finished and all of the said formers may be withdrawn together from the stack. The formers 20 are preferably of sheet metal and are or may be about eight inches wide and ten inches high in transverse section. They are illustrated as being of rectangular formation but they could be cylindrical or of any suitable form in cross section.

After a stack has been built up to a level of about ten or twelve inches above the space formers 20 I prefer to lay on the stack one or more space formers 21 which will extend longitudinally of the stack at about right angles to the lower space formers. The bottoms of these longitudinal space formers will be at about the top edges of the side boards 6. Said longitudinal space formers are or may be formed of sheet metal of suitable cross section to produce ventilating air spaces through the stack, and have attached to one end a handle 22 by which they may be pulled out of the completed stack (which has not yet been done, as shown in Fig. 2), this operation being independent of the withdrawal of the main space forming device to which the longitudinal space formers are not attached. The space formers 20 may be held in adjusted position by pivot and clamping screws 23.

In carrying out my process, which may be readily applied to grain cut on straws of any length and to headed grain, supposing that wheat has been cut which is nearly ripe but green enough to contain in the straws a considerable amount of sap and moisture, I form the same, as the grain is cut, into stacks having in their bottoms a ventilating air space. This may be done by apparatus such as shown and described in my said patent, or by other apparatus suitable for the purpose. When the stack former of such apparatus is filled with the cut grain the stack is deposited at a convenient place and as the cutting proceeds a suitable number of such stacks, say three, are deposited near together. These stacks may be left for a short period of curing and the process of curing and the improving of the grain berries in such stacks will proceed, some of the sap will be taken up by the grain berries and a considerable part of the moisture will pass out. After a few days, say from five to ten days, the length of time depending mainly upon the convenience of the farmer, the herein described air space former is drawn to a point between said deposited stacks and the grain from them is restacked and combined into a single stack upon the said space forming device, as already described. The space forming devices are then withdrawn from the stack and the same can be left for a more extended period of curing and until it is convenient to perform the threshing operation. In such restacking the drier grain from the exteriors of the smaller stacks is or may be built into the interior of the large stack, and the grain containing more moisture and sap is built on to the exterior and top parts of the same, the result being that in the final period of curing there is no danger from deterioration of any of the grain, though it was cut when relatively green, by reason of overheating or molding.

When the time for threshing arrives there will be, in the case of the example above supposed, only one third as many stacks to be handled and relatively few men and teams can transport the larger stacks to the thresher so as to keep the latter constantly employed, with material saving of time and labor.

The large stacks are so transported to the thresher by an appliance in the nature of a bull rake on wheels, the teeth of which are drawn under the stack and elevated to lift a stack a little from the ground, and which is then drawn by teams or tractor power to carry the stack to the thresher.

It will be understood that the use of my air space forming device is not necessarily confined to employment in performance of the said method, but may be used for the formation of stacks however the grain be originally cut and deposited.

The process will be varied, for instance in respect of time of curing and amount or total length and arrangement of the ventilating air spaces, according to the nature of the grain which is being treated, barley and oats, for example, being more subject to overheating and fermentation.

Preferably the stack will be formed of an oblong shape with the lower space formers extending crosswise of the stack, and the second and adjustable stack formers extended in the same direction, so that the uppermost space formers extend lengthwise of the stack. These latter separate space formers may be used in the stacking of grain, a suitable number of them being arranged in the stack at different levels and at angles to each other as may be desired, irrespective of the use of the said lower space formers and said adjustable space formers.

I have discovered that by providing a stack formed of grain on the stalk with ventilating air spaces arranged at different heights the perfect and even maturing and curing of the grain berries is materially promoted. This appears to be due to the distribution of heated and moist air evenly throughout the stack, so that heat and moisture are taken away from those parts of the stack where they are in excess and are allowed to pass readily to upper parts of the stack where they may assist in the further growth and maturing of the grain berries.

The lower air spaces serve for the entrance of air into the stack to take the place of that which passes away from the upper parts of the stack in a more or less heated condition and as the heated air, taking up moisture in its passage, rises from the lower parts of the stack it tends to collect in the upper air spaces and to be thereby freely distributed to the parts of the stack which are around and above the upper air spaces; the object being to preserve the sap and moisture in the stack for as long a time as it may act in furthering the growth and maturing of the grain berries, even up to the time of threshing, but at the same time to prevent the confinement of moisture in any part of the stack to such an extent as will cause the overheating, burning, molding or otherwise spoiling of the neighboring grain berries; and this is accomplished by the distribution of heat and moisture throughout the stack, by means of the air spaces arranged as described, and the reducing of the same in any part of the stack to a degree which is not harmful and is beneficial, rather than by seeking to drive off as rapidly as possible all of the sap and moisture, as is done in the usual drying of grain on the stalk whether in bundles or in stacks.

An important advantage results from the concentrating of the grain into large stacks according to the above process, because they interfere very little with immediate plowing, before the threshing; also there will be relatively few places in the field where stacks are deposited, and there will be correspondingly little injury to the next crop, such as a crop of alfalfa or grass, which would be smothered out by shocks or attacks wherever they stand on the field for any considerable period of time, and my process effects a great saving in the aggregate in the amount of and value of such next crop.

By taking care as to the place of deposit of the smaller stacks and of the larger stacks they can be arranged, often at the sides of the field, so as to be very little in the way of immediate plowing.

At 24 are shown runners adapted to support the front end of the machine when it is lowered to the ground. In transporting the space forming devices down hill these runners may be used to prevent the device from running on to the horses.

It will be understood that a stack may be formed with ventilating air spaces by the use of the forming devices 12 and without the use of the formers 20 and 21. When a stack is to be formed the forward ends of the space formers 12 may be elevated by means of the handle 10 so that the formers 12 will decline rearwardly, and after the stack has been formed the said formers may be partly released from tight engagement with the stack by restoring them to horizontal position before the forming device is drawn from the stack. The tops of all of the forming devices may be of arched form, as I have shown in other applications. 25 indicates braces extending diagonally from the side bars 5 to the front bar 2 and bolted thereto (Fig. 3).

What I claim is:

1. A process of stacking and curing grain, which consists in forming a stack of the same, allowing the grain berries to mature and cure in said stack; then, before overheating or spoiling of the berries in the interior of the stack, restacking said stack, at the same time forming therein a defined ventilating air space and disposing in the interior of the second stack the drier grain from the exterior parts of the first stack, and disposing on the exterior of said second stack the moister grain from the interior of said first stack.

2. A process of stacking and curing grain, which consists in forming stacks of the same, allowing the grain berries to mature and cure in said stacks, then, before overheating or spoiling of the berries in the interior of the stacks, restacking a plurality of said stacks in one larger stack, at the same time forming therein a defined ventilating air space and disposing in the interior of said larger stack the drier grain from the exterior parts of said smaller stacks and disposing on the exterior of said larger stack the moister grain from the interior of said smaller stacks.

In testimony whereof, I affix my signature.

DAVID M. GRAHAM.